(12) United States Patent
Amano et al.

(10) Patent No.: US 8,062,396 B2
(45) Date of Patent: Nov. 22, 2011

(54) APPARATUS FOR COLLECTING DUST AND A PLEATED-TYPE FILTER THEREFOR

(75) Inventors: Hiroyuki Amano, Aichi-ken (JP); Hiroaki Watanabe, Aichi-ken (JP); Hidenori Ikeno, Aichi-ken (JP); Tomoyuki Suzuki, Aichi-ken (JP)

(73) Assignee: Sintokogio, Ltd., Aichi (JP)

( * ) Notice: Subject to any disclaimer, the term of this patent is extended or adjusted under 35 U.S.C. 154(b) by 434 days.

(21) Appl. No.: 12/374,979

(22) PCT Filed: Jun. 28, 2007

(86) PCT No.: PCT/JP2007/063010
§ 371 (c)(1),
(2), (4) Date: Jan. 23, 2009

(87) PCT Pub. No.: WO2008/013024
PCT Pub. Date: Jan. 31, 2008

(65) Prior Publication Data
US 2009/0183472 A1 Jul. 23, 2009

(30) Foreign Application Priority Data

Jul. 24, 2006 (JP) .................................. 2006-200471
Aug. 23, 2006 (JP) .................................. 2006-226667
Aug. 25, 2006 (JP) .................................. 2006-229646
Mar. 7, 2007 (JP) .................................. 2007-056543

(51) Int. Cl.
*B01D 46/00* (2006.01)
(52) U.S. Cl. ............................... 55/302; 55/498; 55/521
(58) Field of Classification Search .................... 55/486, 55/487, 497, 521, 527, 528; 210/321.84, 210/433.1, 489, 494.1
See application file for complete search history.

(56) References Cited

U.S. PATENT DOCUMENTS 4,857,192 A * 8/1989 Kusuda et al. ........... 210/321.84
5,562,746 A 10/1996 Raether
(Continued)

FOREIGN PATENT DOCUMENTS

JP 63-319018 A 12/1988
(Continued)

OTHER PUBLICATIONS

International Search Report, PCT/JP2007/063010.

*Primary Examiner* — Duane Smith
*Assistant Examiner* — Minh-Chau Pham
(74) *Attorney, Agent, or Firm* — Finnegan, Henderson, Farabow, Garrett & Dunner, L.L.P.

(57) ABSTRACT

The purpose of this invention is to provide a pleated-type filter used for an apparatus for collecting dust that is optimally designed and to provide the apparatus for collecting dust using the filter, wherein the pleated-type filter can keep the resistance to its ventilation low when the filter is installed in the apparatus for collecting dust so that the pleats are directed vertically, and wherein the area for installing the main bodies of the pleated-type filters can be reduced as much as possible. The ratio of the apertures of the pleats (P/H) that is defined by the intervals (P) between the crests of adjacent pleats of the main body and the heights (H) of its pleats ranges from 0.1 to 0.3. The ratio is determined based on the relationship between the area for installing the pleated-type filters and the ratio of the apertures of the pleats (P/H). This is done by using the resistance to ventilation of the contaminated filtering cloth, which resistance corresponds to a coefficient of resistance that is caused by a filtering cloth and residual dust that cannot be shaken off from the filter by means of the shaking-off operation.

8 Claims, 11 Drawing Sheets

U.S. PATENT DOCUMENTS

| | | |
|---|---|---|
| 6,517,612 B1 * | 2/2003 | Crouch et al. .................. 95/277 |
| 2004/0261375 A1 | 12/2004 | Scheuch |
| 2008/0047430 A1 * | 2/2008 | Kobori ........................... 95/283 |

FOREIGN PATENT DOCUMENTS

| | | |
|---|---|---|
| JP | 07-016413 | 1/1995 |
| JP | 08-309137 | 11/1996 |
| JP | 9-511942 A | 12/1997 |
| JP | 10-230121 A | 9/1998 |
| JP | 2000-042336 A | 2/2000 |
| JP | 2001-300237 A | 10/2001 |
| JP | 2004-534646 A | 11/2004 |
| JP | 2005-507763 A | 3/2005 |
| JP | 2005-125179 A | 5/2005 |

* cited by examiner

APPARATUS FOR COLLECTING DUST AND A PLEATED-TYPE FILTER THEREFOR

TECHNICAL FIELD

This invention relates to a pleated-type filter used for an apparatus for collecting dust. Particularly, this invention relates to a pleated-type filter used for an apparatus for collecting dust comprising a cylindrical inner member having a plurality of holes in its cylindrical structure and a main body of a pleated-type filter formed by a filtering cloth, wherein the filtering cloth having a sheet-like shape is folded so as to form a pleated cylindrical body that has pleats directed in the longitudinal direction of the cylindrical body, and wherein the pleated cylindrical body is disposed around the cylindrical inner member. This invention also relates to an apparatus for collecting dust using the pleated-type filter.

BACKGROUND OF THE INVENTION

Generally, a conventional filter for an apparatus for collecting dust has a cylindrical shape having a bottom plate. Thus, to get the resistance to the ventilation of the filter to a low level and to enlarge the area of filtration, a long filter with a large diameter is required. Accordingly, a cabinet of an apparatus for collecting dust, which cabinet has many filters, becomes large. Therefore, there is a problem such that a large space is required to install the apparatus for collecting dust.

As an example of a conventional apparatus for collecting dust, there is the following apparatus. The apparatus for collecting dust is comprised of a housing, a set of hollow filters disposed in the housing, and a device for shaking off dust from filters by means of jets for reverse cleaning. This device is disposed in the housing, wherein the device comprises a plurality of blowing tubes, which are arranged so that they correspond to the rows of the filters, a source for providing compressed air to each blowing tube, and a plurality of passages of the jets disposed at the blowing tubes, which passages correspond to the openings of each hollow filter. At least one of the areas of the opening of the passage of the jet, the resistance to ventilation of the passage of the jet, and the effective area of the wall for receiving a flow of air, which wall is disposed at the entrance of the passage of the jet, is set as a variable parameter. The variable parameter is varied along the blowing tubes, from the proximal ends to the distal ends of the blowing tubes, so as to equalize the amounts of the air from the jets of each passage. (See Patent Document 1.)

For this pulse-jet-type apparatus for collecting dust, which has the technical features explained in the above paragraph, when the compressed air is blown into the hollow filter, generally 5~10 times more secondary air than the compressed air that is blown into the hollow filter is sucked into the filter with the compressed air, based on the ejector effect. Accordingly, the secondary air helps to shake off the dust from the filters.

For this conventional and pulse-jet-type apparatus for collecting dust, to have the height of the apparatus be reduced as much as possible, the distance between the short pipes forming the passages of the jets and the hollow filters is shortened. This configuration allows the compressed air to be definitely blown into the hollow filters. However, since the amount of the secondary air is decreased, there is a problem such that the performance for shaking off the dust from the filters is reduced.

Recently, to solve the problem, a pleated-type filter that has a pleated cylindrical body and that is used for an apparatus for collecting dust has been developed. The pleated cylindrical body is made by folding a filtering cloth having a sheet-like shape. Its pleats are directed in the longitudinal direction of the cylindrical body. (See Patent Document 2.)

Patent Document 1: Japanese Patent Publication Laid-open No. H07-16413
Patent Document 2: Japanese Patent Publication Laid-open No. H08-309137

DISCLOSURE OF INVENTION

For the conventional pleated-type filter used for an apparatus for collecting dust that has the constitution explained in the above paragraphs, when the filter is installed in the apparatus for collecting dust so that the pleats are directed vertically it is required that the area of filtration be enlarged. This purpose is achieved by shortening the intervals between crests of adjacent pleats of the main body of a pleated-type filter, or by increasing the heights of its pleats. However, these approaches cause problems such that the performance for shaking off the dust from the filter is decreased, or the resistance to the ventilation of the filter is heightened. Further, for the apparatus for collecting dust using this pleated-type filter, it is desired to reduce the area for installing the apparatus, or to improve the efficiency for shaking off the dust from the filter.

This invention intends to solve the problems explained in the above paragraph. The purpose of this invention is to provide a pleated-type filter used for an apparatus for collecting dust that is optimally designed and to provide the apparatus for collecting dust using the filter, wherein the pleated-type filter can keep the resistance to its ventilation low, when the filter is installed in the apparatus for collecting dust, so that the pleats are directed vertically, and wherein the area for installing the main bodies of the pleated-type filters can be reduced as much as possible.

The pleated-type filter used for an apparatus for collecting dust of this invention comprises a cylindrical inner member having a plurality of holes in its cylindrical structure and a main body of a pleated-type filter formed by a filtering cloth. The filtering cloth having a sheet-like shape is folded so as to form a pleated cylindrical body that has pleats directed longitudinally toward the cylindrical body. The pleated cylindrical body is disposed around the cylindrical inner member. The ratio of the apertures of the pleats (P/H) that is defined by the intervals (P) between the crests of adjacent pleats of the main body and the heights (H) of its pleats ranges from 0.1 to 0.3.

It is further preferable that the ratio of the apertures of the pleats (P/H) of the main body of the pleated-type filter range from 0.15 to 0.25.

It is further preferable that the pleated-type filter used for the apparatus for collecting dust be a cartridge-type filter.

It is further preferable that the material of the main body of the pleated-type filter be a polyester spunbonded nonwoven fabric, the cloth weight of the main body range from 260±7 ($g/m^2$), the thickness of the cloth range from 0.61±0.03 (mm), and the air permeability of the main body at 12.7 (mmAq) of differential pressure range 10.5±3 ($cc/cm^2/sec$) or 10.0±3 ($cc/cm^2/sec$).

The apparatus for collecting dust of this invention comprises a space for collecting dust and a space for discharging air that are separated by a bulkhead. The pleated-type filters are installed in the space for collecting dust. A jet device for shaking off dust from filters by means of jets for cleaning the filters is installed in the space for discharging air. The amount of the air discharged by the jets is set at a range from 1.3 to 1.5 ($NL/m^2$).

It is further preferable that the ratio (D/S) of the apparatus for collecting dust, which is defined by the diameter (D) of the upper opening of the pleated-type filter and the distance (S) between the upper surface of the pleated-type filter and the jet port of the manifold of the jet device, be set at a range from 0.3 to 0.6.

It is further preferable that the ratio (D/S) of the apparatus be set at a range from 0.4 to 0.5.

It is further preferable that the time of a pulse for jetting air from the jet device of the apparatus be set at a range from 80 to 100 (msec).

It is further preferable that the pressure of the compressed air of the jet device of the apparatus be set at a range from 0.45 to 0.55 (MPa).

By this invention, the ratio of the apertures of the pleats (P/H) is set at a range from 0.1 to 0.3 based on the relationship between the area for installing the main bodies of the pleated-type filters and the ratio of the apertures of the pleats (P/H) of the main bodies, by using the resistance to the ventilation of the contaminated filtering cloth, which corresponds to a coefficient of resistance. Thus, when the pleated-type filter is installed in the apparatus for collecting dust so that the pleats are directed vertically, the pleated-type filter can keep the resistance to its ventilation low. Further, the area for installing the main bodies of the pleated-type filters can be reduced as much as possible. Namely, this invention has significant and practical effects. Further, by using these pleated-type filters for the apparatus for collecting dust, and by determining the conditions for jetting air based on the resistance to the ventilation of the contaminated filtering cloth, the amount of the air of the jet device and the cost of the operation of the apparatus for collecting dust can be reduced.

PREFERRED EMBODIMENTS OF THE INVENTION

The inventors of this invention researched a pleated-type filter used for an apparatus for collecting dust and found the following facts. Namely, they found that the ratio of the apertures of the pleats (P/H) can be set at a range from 0.1 to 0.3 as an optimal value, based on the relationship between the area for installing the main bodies of the pleated-type filters and the ratio of the apertures of the pleats (P/H) of the main bodies, by using the resistance to the ventilation of the contaminated filtering cloth. It corresponds to a coefficient of resistance that is caused by the filtering cloth itself and residual dust that cannot be shaken off from the filter by means of the shaking-off operation. Thus, they found that when this pleated-type filter is installed in the apparatus for collecting dust so that the pleats are directed vertically, the pleated-type filter can keep the resistance to its ventilation low. Further, the area for installing the main bodies of the pleated-type filters can be reduced as much as possible.

Figure 1:
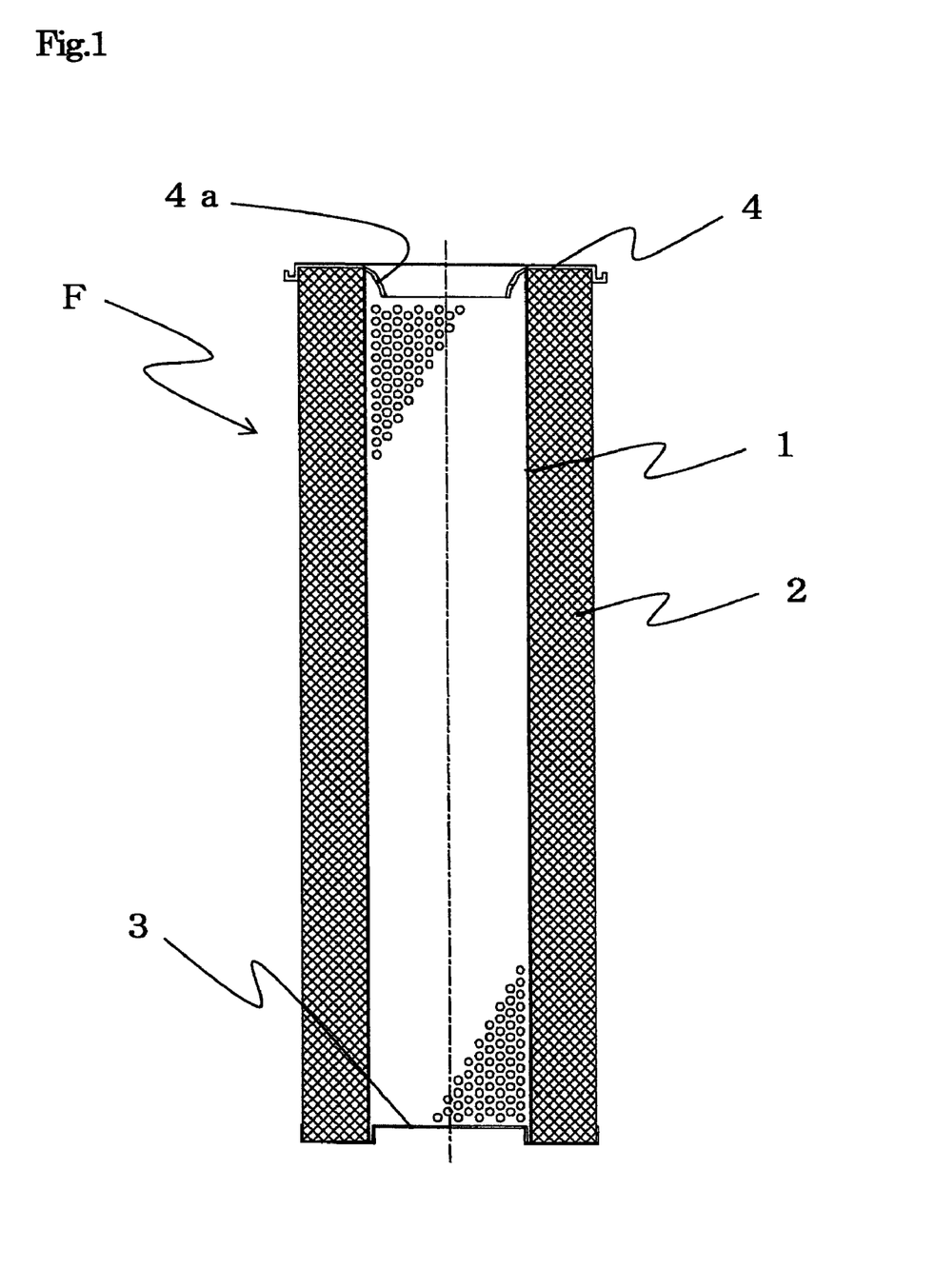
FIG. 1 shows an elevational and sectional view of the embodiment of the pleated-type filter of the present invention. It is used for the apparatus for collecting dust.
Figure 2:
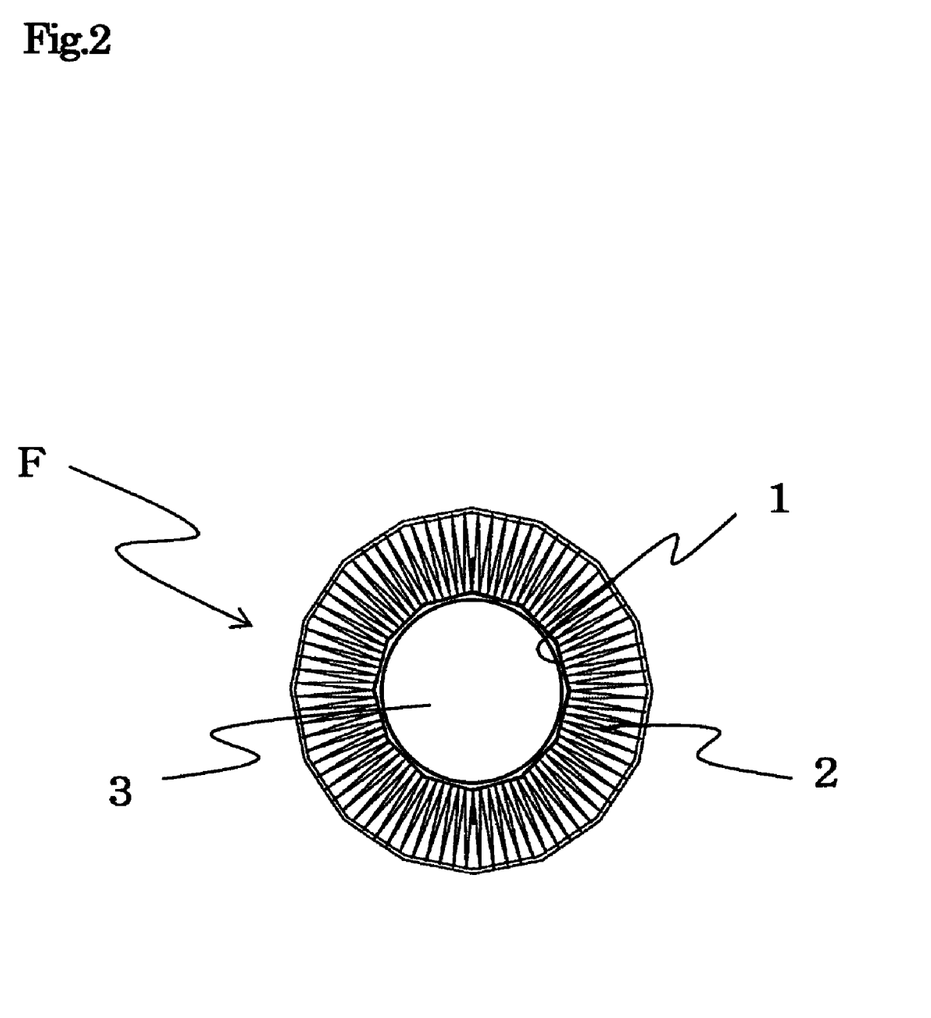
FIG. 2 shows a side and sectional view of the pleated-type filter of FIG. 1.

Below, based on FIGS. 1-11, the preferred embodiments of the pleated-type filter used for the apparatus for collecting dust of this invention are explained in detail. As shown in FIGS. 1 and 2, the pleated-type filter F used for the apparatus for collecting dust comprises a cylindrical inner member 1 having a plurality of holes in its cylindrical structure and a main body 2 of a pleated-type filter F formed by a filtering cloth. The filtering cloth having a sheet-like shape is folded so as to form a pleated cylindrical body that has pleats directed longitudinally toward the cylindrical body. The pleated cylindrical body is disposed around the cylindrical inner member 1. It also comprises a support member 3 that has a polygonal plate-like shape. The support member 3 is concentrically disposed below the main body 2 and is fixed to the lower end of the cylindrical inner member 1. It further comprises a cover member 4 having a polygonal doughnut-plate-like shape. The cover member 4 is concentrically disposed on the main body 2 and is fixed to the upper end of the cylindrical inner member 1. A venturi portion 4a is disposed at the inner periphery of the cover member 4.

Figure 3:
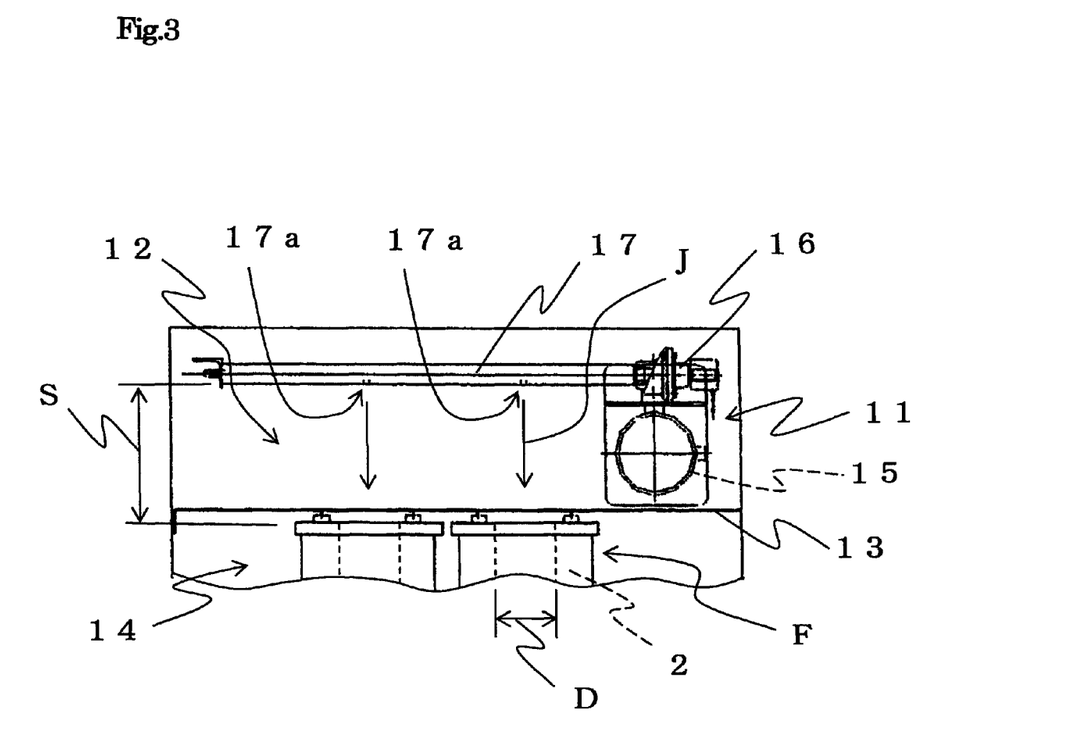
FIG. 3 shows an elevational and sectional view of the main part of the apparatus for collecting dust.
Figure 4:
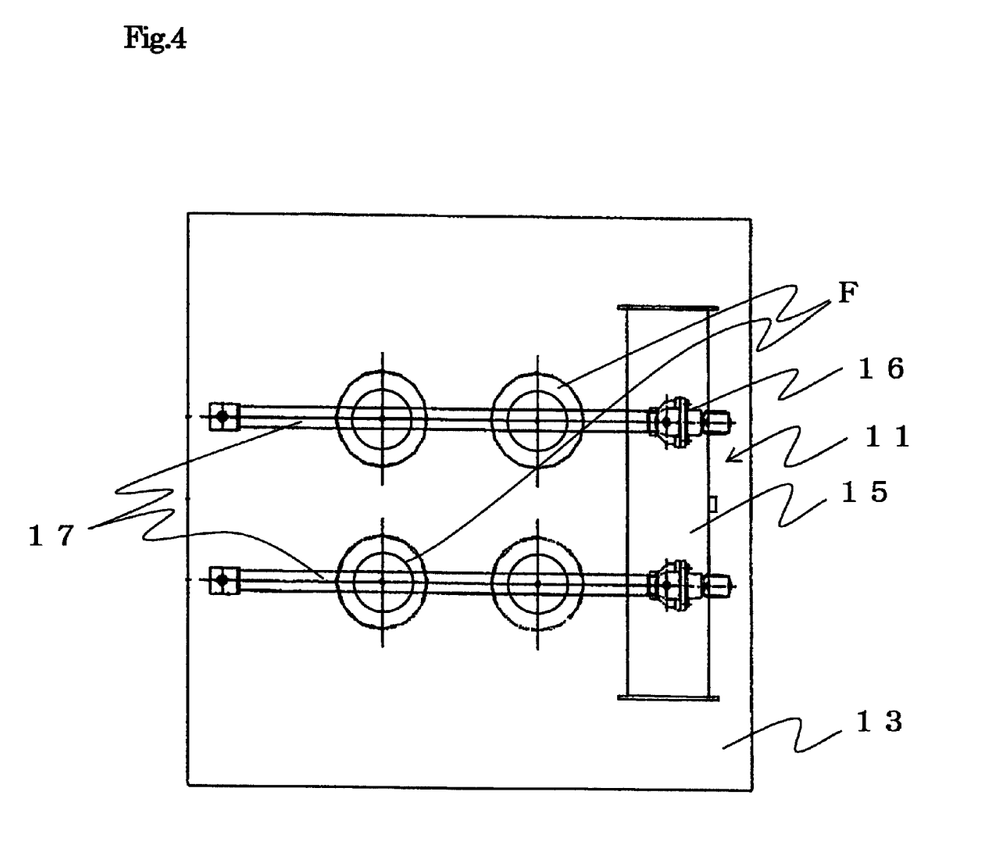
FIG. 4 shows the jet device for shaking off dust from filters of the apparatus for collecting dust.

As shown in FIGS. 3 and 4, a predetermined number of pleated-type filters, as, say, the four filters of this embodiment, are installed in a space 14 for collecting dust that is separated from a space 12 for discharging air by a bulkhead 13. The jet device (reverse cleaning device) 11 that constitutes a part of a pulse-jet-type apparatus for collecting dust is located in the space 12. The pleated-type filters F are each a cartridge-type. They can be attached to and detached from, the bulkhead 13 by suspending them from the bulkhead 13. The jet device 11 comprises an air tank 15, an air valve 16, and a manifold 17, which corresponds to a blowing tube. The air jet J for cleaning the filter that is jetted from the two jet ports 17a disposed at the manifold 17 flows into the pleated-type filter F (the inside of the cylindrical inner member 1 and the main body 2 of a pleated-type filter F). By the jet device 11, when the dust attached to the filters F is shaken off by the compressed air blown into the upper openings of the filters F from the manifold 17, which filters are suspended from the bulkhead 13, it becomes possible to improve the efficiency for shaking off the dust from the filters F.

The material of the main body 2 of the pleated-type filter F is a polyester spunbonded nonwoven fabric. The weight of the cloth of the polyester spunbonded nonwoven fabric ranges from 260±7 (g/m$^2$). Its thickness ranges from 0.61±0.03 (mm). The air permeability of the main body 2 at 12.7 (mmAq) of a differential pressure ranges from 10.5±3 (cc/cm$^2$/sec) or 10.0±3 (cc/cm$^2$/sec).

When the pleated-type filters F are installed in the apparatus for collecting dust so that the pleats of the main body 2 are directed vertically, the resistance to the ventilation of the pleated-type filters F can be reduced, and the area for installing the main bodies 2 of the pleated-type filters F, which have a large area of filtration, can be reduced as much as possible. Below, the reasons for this are explained.

Now, the area of filtration is defined as the total area of a filtering cloth that is determined based on the rate of the air volume (m$^3$/min) that collects dust and the rate of the air (m/min) passing through the filtering cloth of the main body 2. The area for installing the main bodies 2 is defined as a planar area that is required to install the main bodies 2 in the apparatus for collecting dust.

A loss of pressure of the pleated-type filter F is defined as the total loss of pressure of the filtering cloth. It includes the loss caused by residual dust remaining after the operation for shaking off dust is completed and caused by a layer of dust that accumulates in the filter F. This calculation is based on the assumption that the layer of the dust that accumulates on the filtering surface of the filter is uniformly shaken off by the operation for shaking off the dust. The loss of pressure is expressed by the following equation.

$$\Delta P = (\zeta d + \alpha \times c \times u \times t) \times \mu \times u \qquad (1)$$

Here: $\zeta d$ is defined as a resistance to ventilation (1/m) of a contaminated filtering cloth. Namely, it is defined as a coefficient of the resistance to ventilation of the filtering cloth. It includes the resistance caused by residual dust remaining after the operation for shaking off dust is completed.

$\alpha$ is defined as a specific resistance to ventilation (m/kg) of a layer of dust. Namely, it is defined as a coefficient of a resistance to the ventilation of the layer of dust newly accumulated in the filter after the operation for shaking off dust is completed.

c is defined as a concentration of dust (g/m³) that is determined based on the amount of the dust that has accumulated on the filtering cloth.

u is defined as the rate of air (m/min) passing through a filtering cloth.

t is time (min).

μ is the viscosity of the air (Pa·s).

For this embodiment, since the element of "(α×c×u×t)" of equation (1) is varied based on the concentration of dust (c) and the time (t), a loss of pressure caused by a filter is evaluated based on the resistance to ventilation (ζd) of a contaminated filtering cloth, which resistance has a constant value.

Below, some Examples are explained. However, note that the present invention is not limited by them.

EXAMPLE 1

Figure 5:
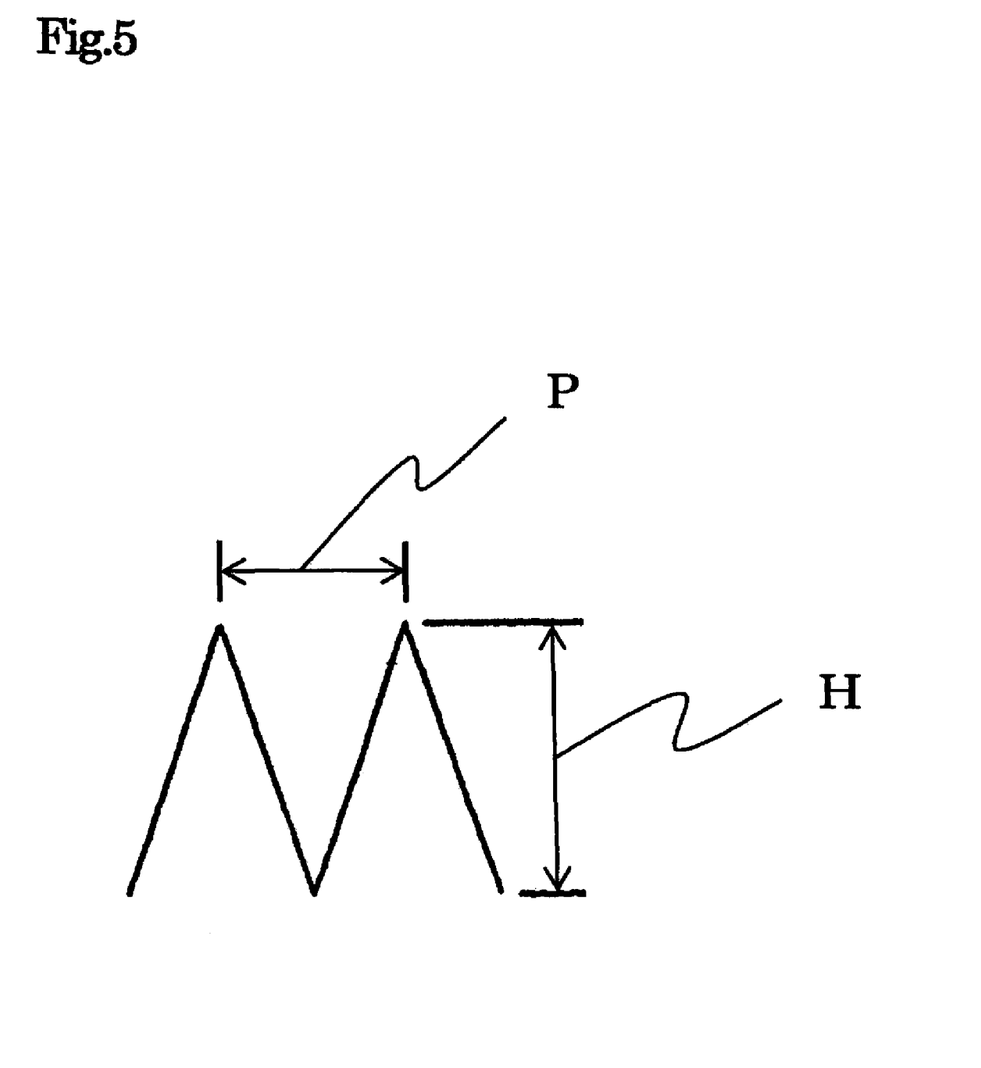
FIG. 5 is a schematic diagram showing the ratio of the apertures of the pleats (P/H).
Figure 6:
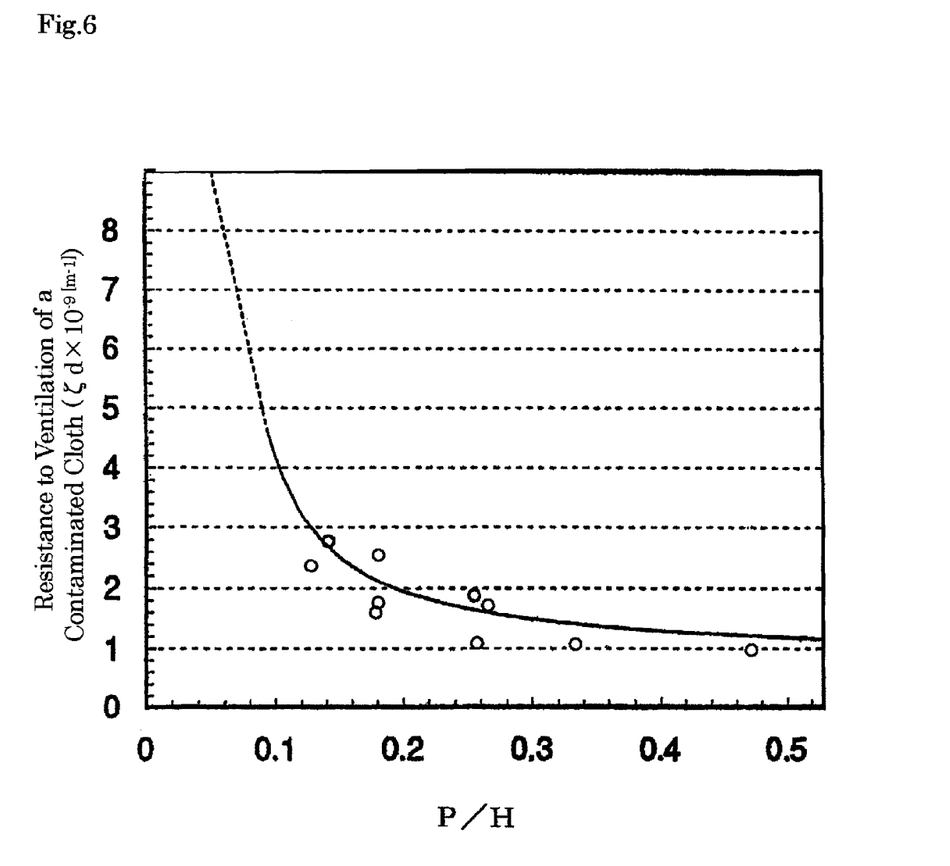
FIG. 6 is a graph showing the relationship between the ratio of the apertures of the pleats (P/H) of the main body of the pleated-type filter and the resistance to ventilation of a contaminated cloth (ζd).

First, as in FIG. 5, the ratio of the apertures of the pleats (P/H) is defined by the intervals (P) between two crests of adjacent pleats of the main body 2 and the heights (H) of its pleats. Then the resistance to ventilation (ζd) of a contaminated filtering cloth was measured while varying the ratio of the apertures of the pleats (P/H). After the operation for shaking off the dust from the filter, the apparatus for collecting dust was driven until the amount of the change per unit time of the loss of the pressure of the main body reached a constant value. Then, the curve of the loss of the pressure of the main body versus time was measured. Next, the (ζd) was determined by comparing the equation (1) with the curve of the loss of the pressure of the main body versus time. Then, based on the resultant of the determined (ζd), the data regarding the resistance to the ventilation of a contaminated cloth (ζd) versus the ratio of the apertures of the pleats (P/H) were plotted on a graph. It is shown in FIG. 6. It shows a curve (a regression curve) expressing the outline of these data.

From FIG. 6, the following became clear. Namely, up to 0.2 of the ratio of the apertures of the pleats (P/H), the resistance to ventilation of a contaminated cloth (ζd) rapidly decreases as the ratio of the apertures of the pleats (P/H) increases. However, when the range where the ratio of the apertures of the pleats (P/H) was greater than 0.2, the ζd moderately decreased as the ratio (P/H) increased. The reason for this fact was interpreted as follows: When the ratio (P/H) was less than 0.2, since the dust densely accumulated between the pleats of the main body 2 of the pleated-type filters, the effective area of the filtration became smaller than the actual area of the filtration that was formed by the main body 2 of the pleated-type filters. As the ratio of the apertures of the pleats (P/H) increased, the resistance to ventilation of a contaminated cloth (ζd) decreased. However, since the area of the filtration was also reduced, accordingly, a large area for installing the main bodies of the pleated-type filters was required. Thus, for the design of an apparatus for collecting dust, it is necessary to determine the optimal ratio of the apertures of the pleats (P/H) by considering the area for installing the main bodies of the pleated-type filters, besides considering the performance for shaking off the dust from the filter.

Below, the equation for evaluating the area for installing the main bodies of the pleated-type filters is explained.

The specific ratio of the apertures of the pleats ($P_S/H_S$) was defined as a reference by arbitrarily selecting it. The area for installing the main bodies of the pleated-type filters F that had the specific ratio of the apertures of the pleats ($P_S/H_S$) was defined as ($A_S$), when they were installed in the apparatus for collecting dust, so that the filters were directed vertically, as in FIG. 1. The resistance to the ventilation of the contaminated filtering cloth was defined as ($ζd_S$).

Further, the area for installing the main bodies of the pleated-type filters F that had the ratio of the apertures of the pleats (P/H) was defined as (A), and the resistance to the ventilation of the contaminated filtering cloth was defined as (ζd).

It was assumed that the diameter (D) of the cylindrical inner member of the pleated-type filter used for the apparatus for collecting the dust and the heights (H) of the pleats of its main body remained constant. When the ratio of the apertures of the pleats (P/H) was (m) times higher than that of the specific ratio of the apertures of the pleats ($P_S/H_S$), then to design the apparatus for collecting the dust by using the filter having the ratio of the apertures of the pleats (P/H) so that the total area of the filtration of the filters equaled that of the filters that had the specific ratio of the apertures of the pleats ($P_S/H_S$), the area (A) for installing the pleated-type filters that had the ratio of the apertures of the pleats (P/H) became (m) times higher than the area ($A_S$) for installing the pleated-type filters of the apparatus using the filters that had the specific ratio of the apertures of the pleats ($P_S/H_S$).

$$(P/H)=m(P_S/H_S) \quad (2)$$

Here, since the resistance to ventilation (ζd) of the contaminated filtering cloth becomes (n) times less than the resistance to ventilation ($ζd_S$) of the contaminated filtering cloth, the area of filtration can be (n) times smaller. As a result, the area (A) for installing the pleated-type filters is (m×n) times the area ($A_S$) for installing the pleated-type filters.

$$ζd=nζd_S \quad (3)$$

$$A/A_S=m \times n \quad (4)$$

From equations (2), (3), and (4), the following equation can be obtained:

$$A/A_S=(P/H \times ζd)/(P_S/H_S \times ζd_S) \quad (5)$$

Figure 7:
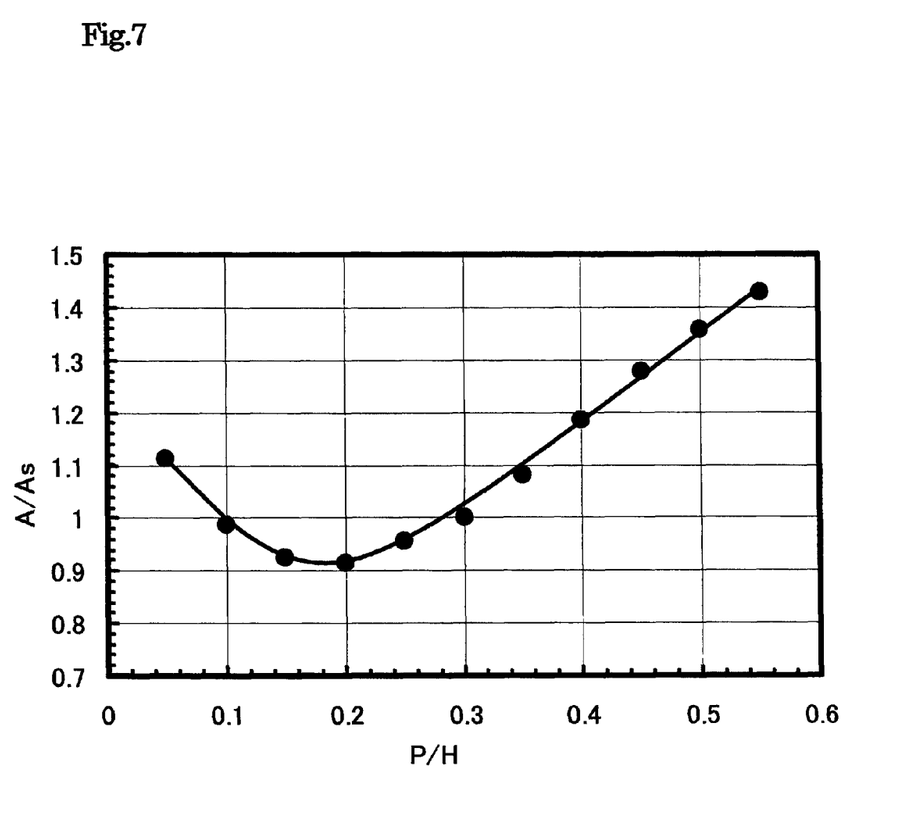
FIG. 7 is a graph showing a relationship between the ratio of the apertures of the pleats (P/H) of the main body of the pleated-type filter and the value of A/A$_S$.

Here, it was assumed that the specific ratio of the apertures of the pleats ($P_S/H_S$) equals 0.3. Further, a plurality of values of the ratio of the apertures of the pleats (P/H) and the resistances to ventilation of the contaminated filtering cloth that correspond to the plurality of values of the ratio were selected from FIG. 6. Then, a plurality of values of $A/A_S$ were calculated by substituting these data into equation (5). Next, the results of the calculation of the $A/A_S$ were plotted in a graph so that the values of the $A/A_S$ corresponded to the plurality of the ratio of the apertures of the pleats (P/H). FIG. 7 was made by connecting the plotted data that showed a curve (a regression curve) expressing the outline of the data.

From FIG. 7, it was known that when the ratio of the apertures of the pleats (P/H) was 0.2, the value of the $A/A_S$ was about 0.92. This was the optimal point, namely, where the area for installing the main bodies 2 of the pleated-type filter could be minimized. When the ratio of the apertures of the pleats (P/H) became greater than 0.2, although the resistance to the ventilation of a contaminated cloth (ζd) decreased, since the area of the filtration of the filters decreased, and since the value of the $A/A_S$ increased, it was required to enlarge the area for installing the main bodies 2 of the pleated-type filter.

In contrast, when the ratio of the apertures of the pleats (P/H) became smaller than 0.2, since the resistance to ventilation of a contaminated cloth (ζd) increased as in FIG. 6, it was required that the area of the filtration of the filters be enlarged. Thus, it was required that the size of the main bodies 2 of the pleated-type filters be enlarged. Accordingly, it was required that the area for installing the main bodies 2 of the pleated-type filter be enlarged.

From the above consideration and FIG. 7, it is seen that the ratio of the apertures of the pleats (P/H), which is defined by the intervals (P) between the crests of adjacent pleats of the main body 2 and the heights (H) of its pleats, of the main body 2 of the pleated-type filter, range from 0.1 to 0.3. It is more preferable that the ratio of the apertures of the pleats (P/H) range from 0.15 to 0.25. The optimal value of it is 0.2.

In the above explanation, it is assumed that the specific ratio of the apertures of the pleats ($P_S/H_S$) equals 0.3. However, even if the value of it is changed, the above conclusion, such that the optimal value of the ratio of the apertures of the pleats (P/H) is 0.2, would still not change, because the curve of FIG. 7 would just move parallel to the original curve and along the vertical axis of it.

EXAMPLE 2

Figure 8:
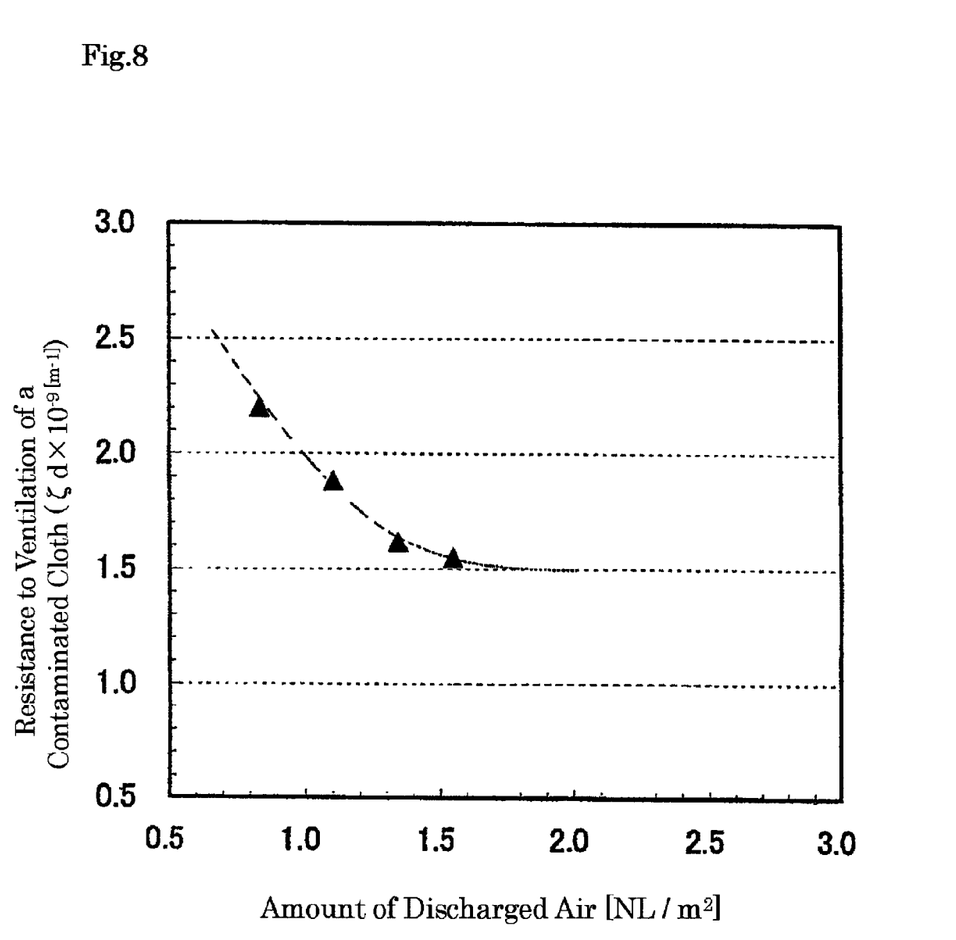
FIG. 8 is a graph showing the relationship between the amount of discharged air per 1 m$^2$ of the area of the filtration of the main body of the pleated-type filter and the resistance to ventilation of a contaminated cloth (ζd).

Next, the relationship between the amount of discharged air per 1 m² of the area of the filtration of the main body 2 of the pleated-type filter and the resistance to ventilation of a contaminated cloth (ζd) was examined. This relationship was measured under the condition such that the ratio of the apertures of the pleats (P/H) was 0.18. The result of the measurements is shown in FIG. 8. From the regression curve of FIG. 8, it is known that a point of inflection of the resistance to ventilation of a contaminated cloth (ζd) is located within 1.3~1.5 (NL/m²; NL: a normal liter) of the amount of discharged air. When the amount of discharged air is less than the range of 1.3~1.5 (NL/m²), the performance for shaking off dust greatly decreases. In contrast, when the amount of discharged air is greater than the range, the performance for shaking off dust is only slightly affected by the change of the amount of discharged air. However, since the amount of discharged air increases, the cost of the operation increases. Thus, it is preferable to set the amount of discharged air in the range of 1.3~1.5 (NL/m²).

EXAMPLE 3

Figure 9:
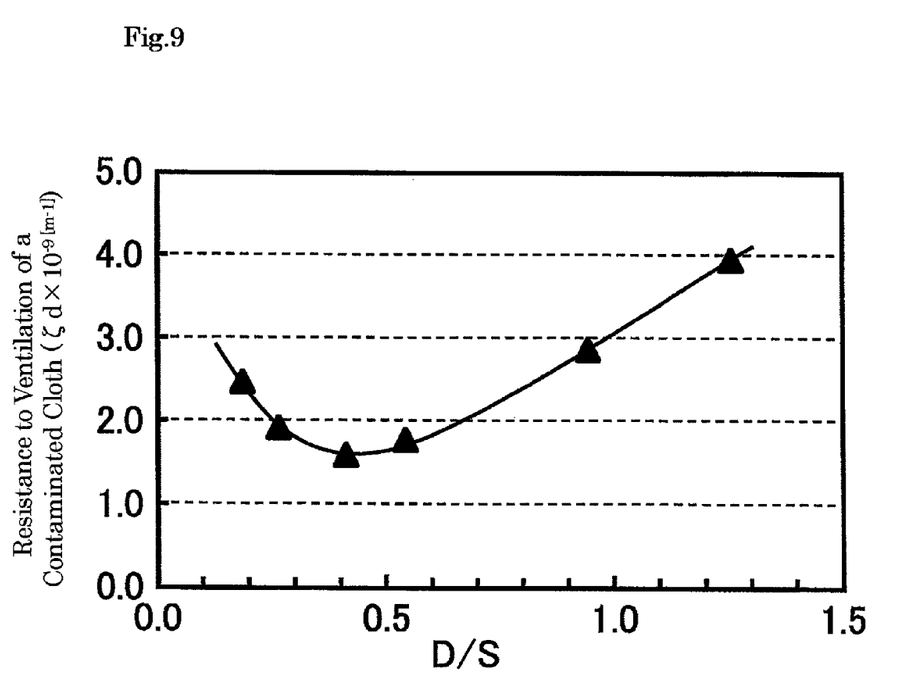
FIG. 9 is a graph showing the relationship between the ratio (D/S) and the resistance to ventilation of a contaminated cloth (ζd). The ratio (D/S) is defined by the diameter (D) of the upper opening of the main body of the pleated-type filter and the distance (S) between the upper surface of the pleated-type filter F and the jet port of the manifold of the jet device.

To design a jet device 11 used for shaking off the dust of the main bodies 2 of the pleated-type filters as in FIG. 3, the relationship between the ratio (D/S), which was defined by the diameter (D) of the upper opening of the main body 2 of the pleated-type filter F and the distance (S) between the upper surface of the pleated-type filter F and the jet port 17a of the manifold 17 of the jet device, and the resistance to ventilation of a contaminated cloth (ζd), was examined. This relationship was measured under the conditions such that the ratio of the apertures of the pleats (P/H) was 0.18, the amount of discharged air was 1.3 (NL/m²), and the diameter of the jet port of the manifold was 8 mm. The result of the measurements is shown in FIG. 9. From FIG. 9, the following becomes clear. A large amount of secondary air is sucked into the main bodies 2 of the pleated-type filter based on the ejector effect caused by the compressed air that is blown into the main bodies 2. Accordingly, the efficiency for shaking off the dust that accumulates in the main body 2 of the filter can be improved. As a result, it is preferable that the ratio (D/S) range from 0.3 to 0.6, since then the resistance to ventilation of a contaminated cloth (ζd) is minimized. It is more preferable that the ratio (D/S) range from 0.4 to 0.5.

EXAMPLE 4

Figure 10:
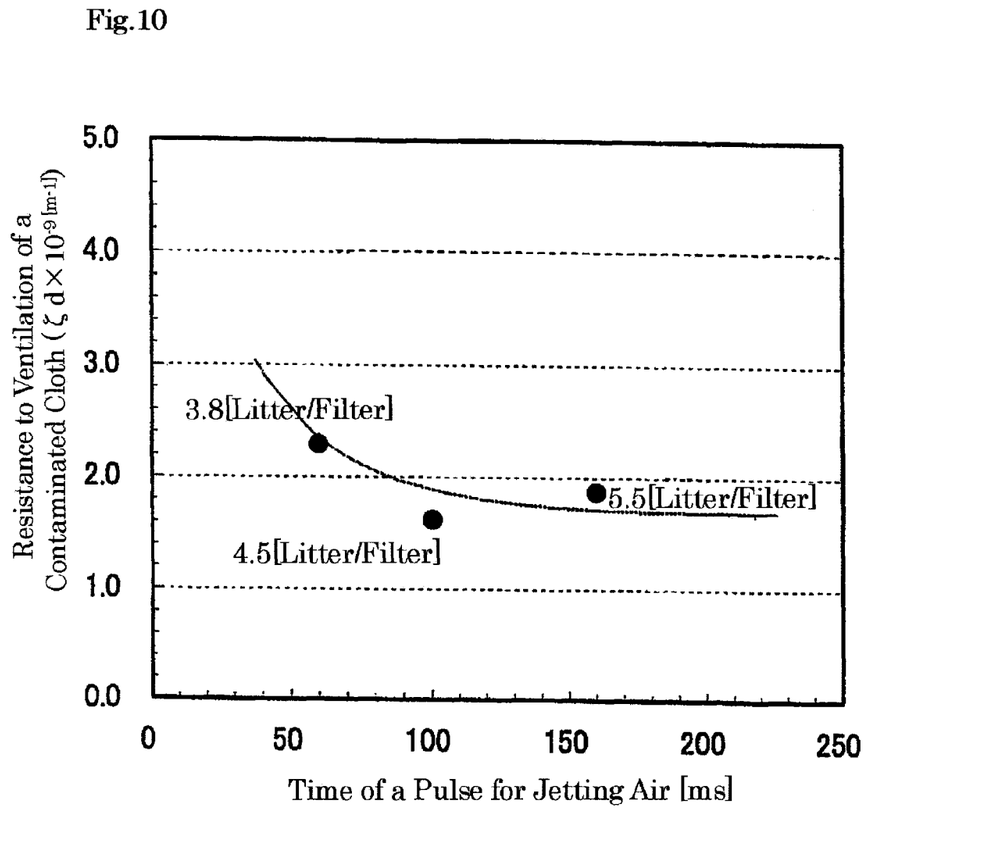
FIG. 10 is a graph showing the relationship between the time of a pulse for jetting air and the resistance to ventilation of a contaminated cloth (ζd).

Next, the relationship between the time of a pulse for jetting air and the resistance to the ventilation of a contaminated cloth (ζd) was examined. This relationship was measured under the conditions such that the ratio of the apertures of the pleats (P/H) was 0.18, the diameter of the jet port of the manifold was 8 mm, and the pressure of the compressed air was 0.5 Mpa. The result of the measurements is shown in FIG. 10. The numerical value in the graph of FIG. 10 denotes the amount of the discharged air per main body of the pleated-type filter. Based on FIG. 10, when the time of a pulse for jetting air is longer than the range of 80~100 (ms), the resistance to ventilation of a contaminated cloth (ζd) decreases slightly. Especially, when the time of a pulse is longer than 100 (ms), the curve of the resistance to ventilation of a contaminated cloth (ζd) becomes flat. Namely, in this range the performance for shaking off the dust is not widely affected by the time of a pulse. Since the amount of the discharged air increases when the time of a pulse increases, the cost of the operation of the apparatus increases.

Thus, it is preferable that the time of every pulse for jetting air range from 80 to 100 (msec). It is more preferable that the time of every pulse for jetting air be 100 (msec).

EXAMPLE 5

Figure 11:
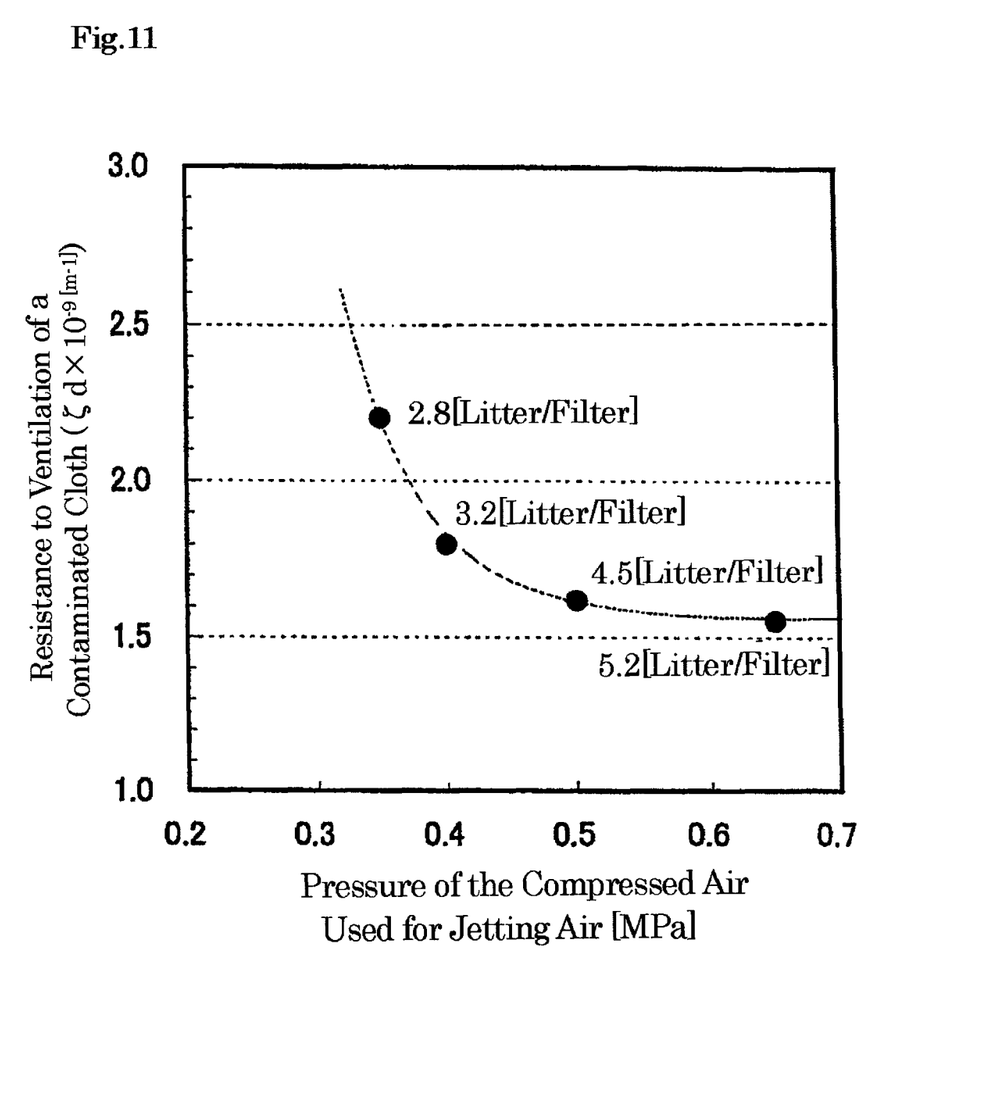
FIG. 11 is a graph showing the relationship between the pressure of the compressed air used for jetting air and the resistance to ventilation of a contaminated cloth (ζd).

Next, the relationship between the pressure of the compressed air used for jetting air and the resistance to ventilation of a contaminated cloth (ζd) was examined. This relationship was measured under the conditions such that the ratio of the apertures of the pleats (P/H) was 0.18, the diameter of the jet port of the manifold was 8 mm, and the time of a pulse for jetting air was 100 (msec). The result of the measurements is shown in FIG. 11. The numerical value in the graph of FIG. 11 denotes the amount of the discharged air per main body of the pleated-type filter. Based on FIG. 11, it is seen that when the pressure of the compressed air is greater than about 0.5 (Mpa), the resistance to ventilation of a contaminated cloth (ζd) slightly decreases. Namely, in this range the performance for shaking off the dust is not widely affected by the pressure of the compressed air. Since the amount of the discharged air increases when the pressure of the compressed air increases, the cost of the operation of the apparatus increases. Thus, it is preferable that the pressure of the compressed air range from 0.45 to 0.55 (MPa). It is more preferable that the pressure of the compressed air be 0.5 (MPa).

Incidentally, from the noise test of the apparatus for collecting dust, it was proven that it is preferable that the pressure of the compressed air range from 0.45 to 0.55 (MPa) and the time of a pulse for jetting air ranges from 80 to 100 (msec), and that it is more preferable that the time of a pulse for jetting air be 100 (msec).

What we claim is:

1. An apparatus for collecting dust that comprises:
a space for collecting dust and a space for discharging air wherein the spaces are separated by a bulkhead,
a plurality of pleated-type filters installed in the space for collecting dust, wherein the pleated-type filter comprises
a cylindrical inner member having a plurality of holes in its cylindrical structure, and
a main body of a pleated-type filter formed by a filtering cloth,
wherein the filtering cloth having a sheet-like shape is folded so as to form a pleated cylindrical body that has pleats directed in the longitudinal direction of the cylindrical body,
wherein the pleated cylindrical body is disposed around the cylindrical inner member,
wherein a ratio of the apertures of the pleats (P/H) that is defined by the intervals (P) between the crests of adjacent pleats of the main body and the heights (H) of its pleats ranges from 0.1 to 0.3, and
wherein the value of the ratio of the apertures of the pleats (P/H) is determined based on the relationship between the area for installing the main bodies of the pleated-type filters and the ratio of the apertures of the pleats (P/H), by using a resistance to a ventilation of the contaminated filtering cloth that corresponds to a coefficient of resistance that is caused by a filtering cloth and residual dust that cannot be shaken off from the filter and
a jet device for shaking off dust from the filters by means of jets for cleaning the filters installed in the space for discharging air,
wherein an amount of the air discharged by the jets is set at a range from 1.3 to 1.5 (NL/m$^2$).

2. An apparatus for collecting dust that comprises:
a space for collecting dust and a space for discharging air that are separated by a bulkhead,
a plurality of pleated-type filters installed in the space for collecting dust, wherein the pleated-type filter comprises
a cylindrical inner member having a plurality of holes in its cylindrical structure, and
a main body of a pleated-type filter formed by a filtering cloth,
wherein the filtering cloth having a sheet-like shape is folded so as to form a pleated cylindrical body that has pleats directed in the longitudinal direction of the cylindrical body,
wherein the pleated cylindrical body is disposed around the cylindrical inner member,
wherein a ratio of the apertures of the pleats (P/H) that is defined by the intervals (P) between the crests of adjacent pleats of the main body and the heights (H) of its pleats ranges from 0.1 to 0.3, and
wherein the value of the ratio of the apertures of the pleats (P/H) is determined based on the relationship between the area for installing the main bodies of the pleated-type filters and the ratio of the apertures of the pleats (P/H), by using a resistance to a ventilation of the contaminated filtering cloth that corresponds to a coefficient of resistance that is caused by a filtering cloth and residual dust that cannot be shaken off from the filter and
a jet device for shaking off dust from the filters by means of jets for cleaning the filters installed in the space for discharging air,
wherein a ratio (D/S), which is defined by a diameter (D) of an upper opening of the pleated-type filter and a distance (S) between an upper surface of the pleated-type filter and a manifold of the jet device, is set at a range from 0.3 to 6.

3. The apparatus for collecting dust of claim 2,
wherein the ratio (D/S) is set at a range from 0.4 to 0.5.

4. An apparatus for collecting dust that comprises:
a space for collecting dust and a space for discharging air that are separated by a bulkhead,
a plurality of pleated-type filters installed in the space for collecting dust, wherein the pleated-type filter comprises
a cylindrical inner member having a plurality of holes in its cylindrical structure, and
a main body of a pleated-type filter formed by a filtering cloth,
wherein the filtering cloth having a sheet-like shape is folded so as to form a pleated cylindrical body that has pleats directed in the longitudinal direction of the cylindrical body,
wherein the pleated cylindrical body is disposed around the cylindrical inner member,
wherein a ratio of the apertures of the pleats (P/H) that is defined by the intervals (P) between the crests of adjacent pleats of the main body and the heights (H) of its pleats ranges from 0.1 to 0.3, and
wherein the value of the ratio of the apertures of the pleats (P/H) is determined based on the relationship between the area for installing the main bodies of the pleated-type filters and the ratio of the apertures of the pleats (P/H), by using a resistance to a ventilation of the contaminated filtering cloth that corresponds to a coefficient of resistance that is caused by a filtering cloth and residual dust that cannot be shaken off from the filter and
a jet device for shaking off dust from the filters by means of jets for cleaning the filters installed in the space for discharging air,
wherein a time of a pulse for jetting air from the jet device is set at the range from 80 to 100 msec.

5. An apparatus for collecting dust that comprises:
a space for collecting dust and a space for discharging air that are separated by a bulkhead,
a plurality of pleated-type filters installed in the space for collecting dust, wherein the pleated-type filter comprises
a cylindrical inner member having a plurality of holes in its cylindrical structure, and
a main body of a pleated-type filter formed by a filtering cloth, wherein the filtering cloth having a sheet-like shape is folded so as to form a pleated cylindrical body that has pleats directed in the longitudinal direction of the cylindrical body, wherein the pleated cylindrical body is disposed around the cylindrical inner member, wherein a ratio of the apertures of the pleats (P/H) that is defined by the intervals (P) between the crests of adjacent pleats of the main body and the heights (H) of its pleats ranges from 0.1 to 0.3, and wherein the value of the ratio of the apertures of the pleats (P/H) is determined based on the relationship between the area for installing the main bodies of the pleated-type filters and the ratio of the apertures of the pleats (P/H), by using a resistance to a ventilation of the contaminated filtering cloth that corresponds to a coefficient of resistance that is caused by a filtering cloth and residual dust that cannot be shaken off from the filter and a jet device for shaking off dust from the filters by means of jets for cleaning the filters installed in the space for discharging air, wherein a pressure of the compressed air of the jet device is set at a range from 0.45 to 0.55 (MPa).

6. The apparatus for collecting dust of any one of claims 1, 2, 4 and 5, wherein the ratio of the apertures of the pleats (P/H) of the main body of the pleated-type filter ranges from 0.15 to 0.25.

7. The apparatus for collecting dust of any one of claims 1, 2, 4 and 5, wherein the pleated-type filter is a cartridge-type filter.

8. The apparatus for collecting dust of any one of claims 1, 2, 4 and 5, wherein the material of the main body of the pleated-type filter is a polyester spunbonded nonwoven fabric, the weight of the cloth of the main body ranges from $260\pm7$ (g/m$^2$), the thickness of the cloth ranges from $0.61\pm0.03$ (mm), and the air permeability of the main body at a differential pressure of 12.7 (mmAq) ranges from $10.5\pm3$ (cc/cm$^2$/sec) or $10.0\pm3$ (cc/cm$^2$/sec).

* * * * *